United States Patent [19]

Vander Wal, III

[11] Patent Number: 5,430,948

[45] Date of Patent: Jul. 11, 1995

[54] COORDINATE MEASURING MACHINE CERTIFICATION SYSTEM

[76] Inventor: H. James Vander Wal, III, 7112 - 30th St., SE., Ada, Mich. 49301

[21] Appl. No.: 91,334

[22] Filed: Jul. 12, 1993

[51] Int. Cl.$^6$ .............................................. G01B 7/008
[52] U.S. Cl. ......................................... 33/502; 33/503
[58] Field of Search ......................... 33/502, 503, 505; 73/1 J

[56] References Cited

U.S. PATENT DOCUMENTS

| | | |
|---|---|---|
| 4,084,323 | 4/1978 | McMurtry . |
| 4,168,576 | 9/1979 | McMurtry . |
| 4,313,263 | 2/1982 | McMurtry . |
| 4,333,238 | 6/1982 | McMurtry . |
| 4,437,151 | 3/1984 | Hurt et al. . |
| 4,492,036 | 1/1985 | Beckwith, Jr. . |
| 4,523,450 | 6/1985 | Herzog . |
| 4,571,847 | 2/1986 | McMurtry . |
| 4,777,818 | 10/1988 | McMurtry . |
| 4,815,213 | 3/1989 | McCabe et al. . |
| 4,819,195 | 4/1989 | Bell et al. . |
| 4,884,348 | 12/1989 | Zeller et al. ........................... 33/502 |
| 4,914,609 | 4/1990 | Shimizu et al. . |
| 4,939,678 | 7/1990 | Beckwith, Jr. . |
| 4,945,501 | 7/1990 | Bell et al. . |
| 4,991,304 | 2/1991 | McMurtry . |
| 5,269,067 | 12/1993 | Waeldele et al. ...................... 33/502 |

FOREIGN PATENT DOCUMENTS 3325397  1/1985  Germany ............................... 33/502

OTHER PUBLICATIONS

"Methods for Performance Evaluation of Coordinate Measuring Machines, ANSI/ASME B89.1.12M–1985," An American National Standard, published by The American Society of Mechanical Engineers, USA, 1985.

Richardson, Rick, "Standards try to help–but don't always agree," *Quality Magazine*, USA, publication date unknown.

Taylor, Benjamin R., "CMM accuracy measurements," *Quality Magazine*, USA, 1986.

Product Brochure entitled "KOBA–Step Precision Step Gauge," published by Kolb & Baumann GmbH & Co., Germany, 1992.

Product Brochure, "Mobile Calibration Station Utilizing Surveillance Masters," published by Glastonbury Gage, USA, publication date unknown.

Product Announcement, "Measurement Methods–Coordinate Measuring Specialists," published by Measurement Methods, Baltimore, Md., USA, publication date unknown.

*Primary Examiner*—Alvin Wirthlin
*Attorney, Agent, or Firm*—Price, Heneveld, Cooper, DeWitt & Litton

[57] ABSTRACT

A method and apparatus for certifying a coordinate measuring machine includes a certified ballbar, having a pair of spherical surfaces connected with a bar and having certified diameters separated by a certified distance, that is positioned with a positioning device. The positioning device includes a bar support that supports the ballbar at a midpoint of the bar between the balls, wherein the ballbar is supported free of attachment to the balls. The positioning device includes a first rotational assembly for rotatably supporting the ball support for rotation motion about a horizontal axis and a second rotational assembly for rotatably supporting the bar support about a vertical axis. The first rotational assembly provides rotation of the bar support in a clockwise direction to position the ballbar in a first set of angular orientations and in a counterclockwise direction to position the ballbar in a second set of angular orientations. The second rotational assembly provides rotation of the bar support in substantially a complete revolution.

22 Claims, 6 Drawing Sheets

COORDINATE MEASURING MACHINE CERTIFICATION SYSTEM

BACKGROUND OF THE INVENTION

This invention relates generally to an apparatus and method for certifying a coordinate measuring machine (CMM) and, more particularly, to a method and apparatus for measuring the repeatability and volumetric accuracy of a coordinate measuring machine. The invention is useful for certifying both manually operated, user manipulable, as well as programmable coordinate measuring machines.

Coordinate measuring machines are capable of accurately gauging, in three-dimensional space, the surfaces of a machined part, or the like, in order to determine compliance with manufacturing tolerances for the part. In order to verify the dependability of the results obtained with the CMM, various techniques have been developed for certifying the performance of the CMM.

One such method and apparatus for certifying a CMM is the subject of an industry standard: ANSI/ASME B89.1.12M-1985. This standard prescribes two independent gauges in order to determine the repeatability and accuracy of the CMM. The first gauge is a bar with balls affixed at each end, known as a "ballbar." While the diameters of tile balls are certified to a known diameter, the distance between the balls is not known with accuracy. Such balls are threaded on and off of the bar for storage purposes, which precludes the ability to certify the center-to-center distance between the balls. The ballbar is positioned in various generally determined locations within the three-dimensional measuring volume of the CMM. The CMM probe and stylus are used to measure the ball diameters. The CMM calculates the diameter of each ball and the center-to-center spacing between the balls. This process is repeated with each value of ball diameter and center-to-center spacing being compared with the other values in order to determine the repeatability of the CMM. In order to certify the linear accuracy of the CMM, the ANSI/ASME standard prescribes a second gauge, namely a step block, which is repositioned along each of the three axes of the CMM. Measurements are made at various of the steps in order to determine the linear accuracy of the CMM scales.

While the ANSI/ASME standard is accepted in the industry and provides a reasonably accurate determination of the important parameters for certifying a CMM, one significant limitation is its difficulty to use. It requires the use of two separate gauges with separate measurement procedures in order to measure the volumetric accuracy and repeatability of the CMM. Another major limitation is that the ANSI/ASME ballbar/step block standard has been useful only in certifying manual operator manipulated CMMs. The ANSI/ASME standard has not been practical for use with programmable CMMs. The difficultly with applying the ANSI/ASME standard to programmable CMMs lies in the manner in which programmable CMMs operate. A programmable CMM must be provided with the location of each point to be measured within approximately 50 thousandths of an inch (0.050 inch). The CMM rapidly moves the stylus to the given location and more slowly moves the stylus until a surface is contacted. A touch-trigger probe supporting the stylus senses the contact and records the position of the stylus when contact is made. The reason the ANSI/ASME standard has not proven practical with programmable CMMs is that the positioning of the ballbars is not sufficiently accurate to allow the programmable CMM to be programmed to measure points on the surfaces of the spheres of the ballbar and, therefore, the automatic movement feature of such programmable CMM cannot be used with the ballbars.

One prior art attempt at overcoming the limitations of the ANSI/ASME standard includes a bar that is universally pivotally supported at one end by a pivot ball for 360° movement in a horizontal plane and approximately ±45° movement in a vertical direction. Guide means, including a pair of parallel rods and a spherical abutment between the rods, is provided at the other end of the bar. A special, certified stylus is fitted to the CMM probe. In use, the certification device is positioned within the measurement volume of the CMM. The bar is removed and the CMM probe is used to establish the location of the pivot ball of the universal pivot in the CMM coordinate system. The bar is replaced and allowed to thermally stabilize and the stylus is manually positioned within the guide means of the bar. The CMM is programmed to rotate the bar around the universal pivot while making measurements at various locations along the imaginary sphere traced by the movement of the guide means. The "length" of the bar between the guide means and pivot is determined at various points in the sphere. Differences in length measurements are used to calculate straightness, squareness and axis roll.

While this approach overcomes the limitations of the ANSI/ASME standard, it is not without its own limitations. The device does not provide satisfactory measurements of the volumetric accuracy of the CMM. Although it measures the distance between the contact point within the guide means and the point of pivot at the universal pivot, the movement between the stylus and the guide means, and the movement of the bar about the universal pivot, precludes a meaningful comparison being made between a measured distance and a sufficiently accurate certified distance as would be required to determine volumetric accuracy. Thermal instability inaccuracies, resulting from manual handling of the bar, only contribute to the problem. Another major deficiency is that it is difficult to use with a manual CMM. The bar is balanced with a counterweight to have a slight downward bias at the guide means. The operator is typically not able to control the interface between the stylus and the guide means sufficiently in order to avoid frequent disengagement with the guide means. When the stylus disengages from the guide means, the downward bias of the guide means causes it to abruptly drop, resulting in the necessity for re-establishing contact between the stylus and the guide means. Furthermore, under any circumstances, it would be impractical for this device to certify the articulation capabilities of the motorized head used with many programmable CMMs to reorient the probe.

A need exists for a coordinate measuring machine certification apparatus and method that is useable with both user controlled manual CMMs and programmable CMMs. The need exists for a CMM certification method and apparatus that is capable of accurately certifying the repeatability and the volumetric accuracy of a CMM in a single series of measurements.

SUMMARY OF THE INVENTION

The present invention provides a method and apparatus for certifying a coordinate measuring machine. For the first time, the present invention provides for the precise determination of repeatability and volumetric accuracy in a single series of measurements of both user manipulable manual CMMs and programmable CMMs. In addition, the present invention provides for certifying the articulation capabilities of the motorized head system used in many programmable CMMs.

A coordinate measuring machine certification apparatus according to one aspect of the invention includes a certification device having at least one calibrated surface and a positioning device for positioning the surface in multiple known locations within the measurement volume of the coordinate machine being certified. A method according to one aspect of the invention includes positioning the calibration surface in multiple known locations within the measurement volume of the coordinate measuring machine being certified. The coordinates at multiple points on the calibrated surface are measured with the coordinate measuring machine at each of the known locations. The measured coordinates are processed into measured surface parameters and compared with known values of the surface parameters in order to determine the accuracy of the coordinate measuring machine. By repeating the method, the repeatability of the coordinate measuring machine may be certified.

According to another aspect of the invention, the certification device may include a certified ballbar having a pair of spherical surfaces connected with a bar. Each of the spherical surfaces has a certified diameter and the center-to-center spacing between the spherical surfaces is a certified distance. A positioning device for positioning the spherical surfaces in multiple known locations within the measurement volume of the coordinate machine includes a first rotational assembly for rotating the ballbar about a horizontal axis in defined increments and a second rotational assembly for rotating the ballbar about a vertical axis in defined increments. A method for certifying a coordinate measuring machine according to another aspect of the invention includes positioning the first and second spheres of the ballbar at predetermined locations within the coordinate measuring space of the coordinate measuring machine. The coordinates at multiple points on each of the spheres are measured with the coordinate measuring machine and processed into measured sphere center parameters. The measured sphere center parameters may be processed into a measured sphere separation distance parameter, which is compared with a known sphere separation distance parameter in order to determine the accuracy of the coordinate measuring system. The measured coordinates may also be processed into a measured sphere diameter parameter, which may be compared with the certified sphere diameter in order to further determine the accuracy of the coordinate measuring system. By repeating the method, the repeatability of the coordinate measuring machine may be certified.

Because the locations at which the calibrated surface of the certification device is positioned are known locations, a programmable CMM may be programmed in order to probe the calibrated surface at each such location. Alternatively, because the calibrated surface is stably positioned at each such location, a user of a manual CMM system may readily probe the calibrated surface using a manual CMM sensing probe. The present invention is capable of certifying a CMM for (a) linear accuracy of the scales; (b) squareness of the ways and (c) accuracy and repeatability of the probe-triggering system. In addition, the present invention is capable of certifying the articulation capabilities of the motorized head system of a programmable CMM. This is accomplished, according to an aspect of the invention, by re-orienting the probe in between measurements taken on the calibrated surface. In this manner, errors in the articulation capability of the motorized head system will be detected because they will be reflected in the repeatability and/or volumetric accuracy measurements made with the CMM during certification.

The present invention is capable of embodiment in either a manually repositionable system or a fully automated system, as will be set forth in more detail below. These and other objects, advantages and features of this invention will become apparent upon review of the following specification in conjunction with the drawings.

DESCRIPTION OF THE PREFERRED EMBODIMENT

Figure 1:
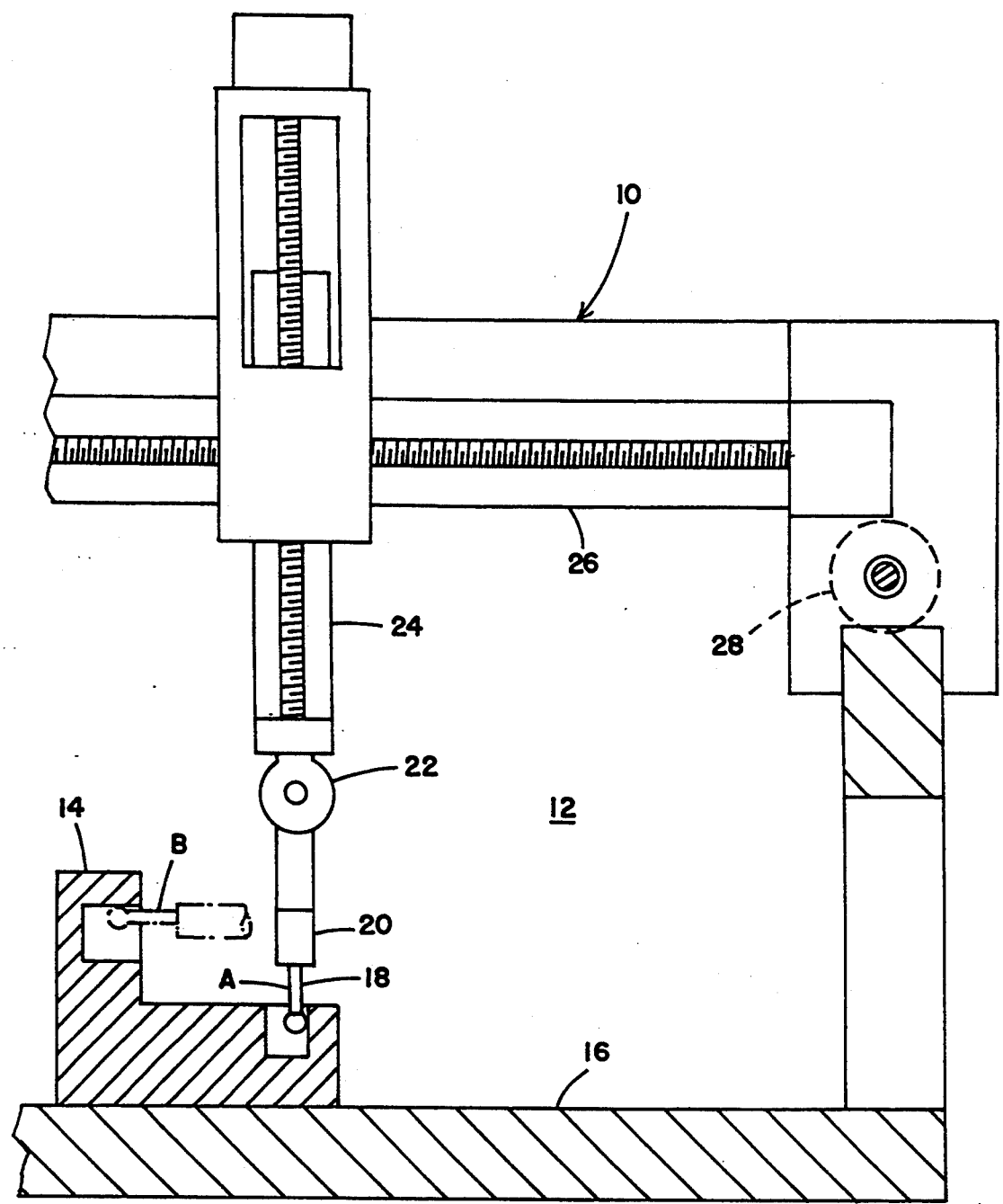
FIG. 1 is a side elevation of a coordinate measuring machine of the type that may be certified according to the present invention.

Referring now specifically to the drawings, and the illustrative embodiments depicted therein, a coordinate measuring machine 10, of the type that may be certified according to the present invention, includes a three-dimensional volumetric space 12 within which a part to be measured 14 is positioned on a measurement surface 16 (FIG. 1). CMM 10 includes a stylus 18, which is mounted by a touch-sensitive probe 20 to a head 22. In the illustrated embodiment, head 22 is motorized, whereby the orientation of stylus 18 and probe 20 may be changed from orientation A to orientation B, as seen in FIG. 1, in order to probe surfaces of various orientation. Head 22 is mounted to a Z-axis way 24 which, in turn, is mounted to an X-axis way 26 which, in turn, is mounted to a Y-axis way 28. CMM 10 may be programmable to position stylus 18 to various predetermined positions within space 12. At each such position, the stylus is moved until probe 20 senses contact with a surface of part 14 at which point the three-dimensional location is measured. Alternatively, CMM 10 may be a manually manipulable system wherein probe 20 is manipulated by a user into engagement with the various surfaces of part 14 and three-dimensional measurements made by actuating an indicating device such as a foot switch, or the like (not shown), at each point to be measured.

Figure 2:
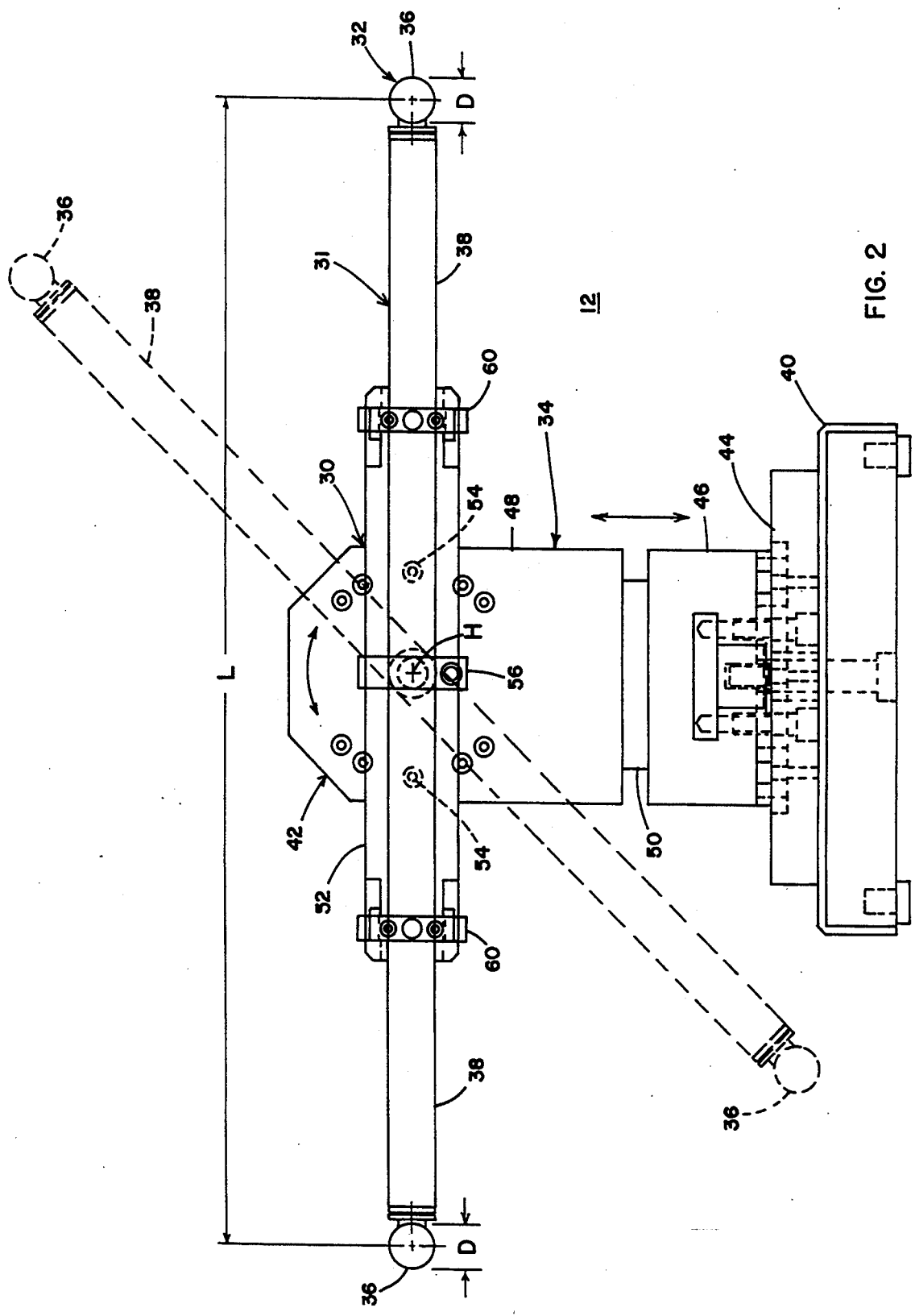
FIG. 2 is a side elevation of a certification apparatus according to the invention.
Figure 3:
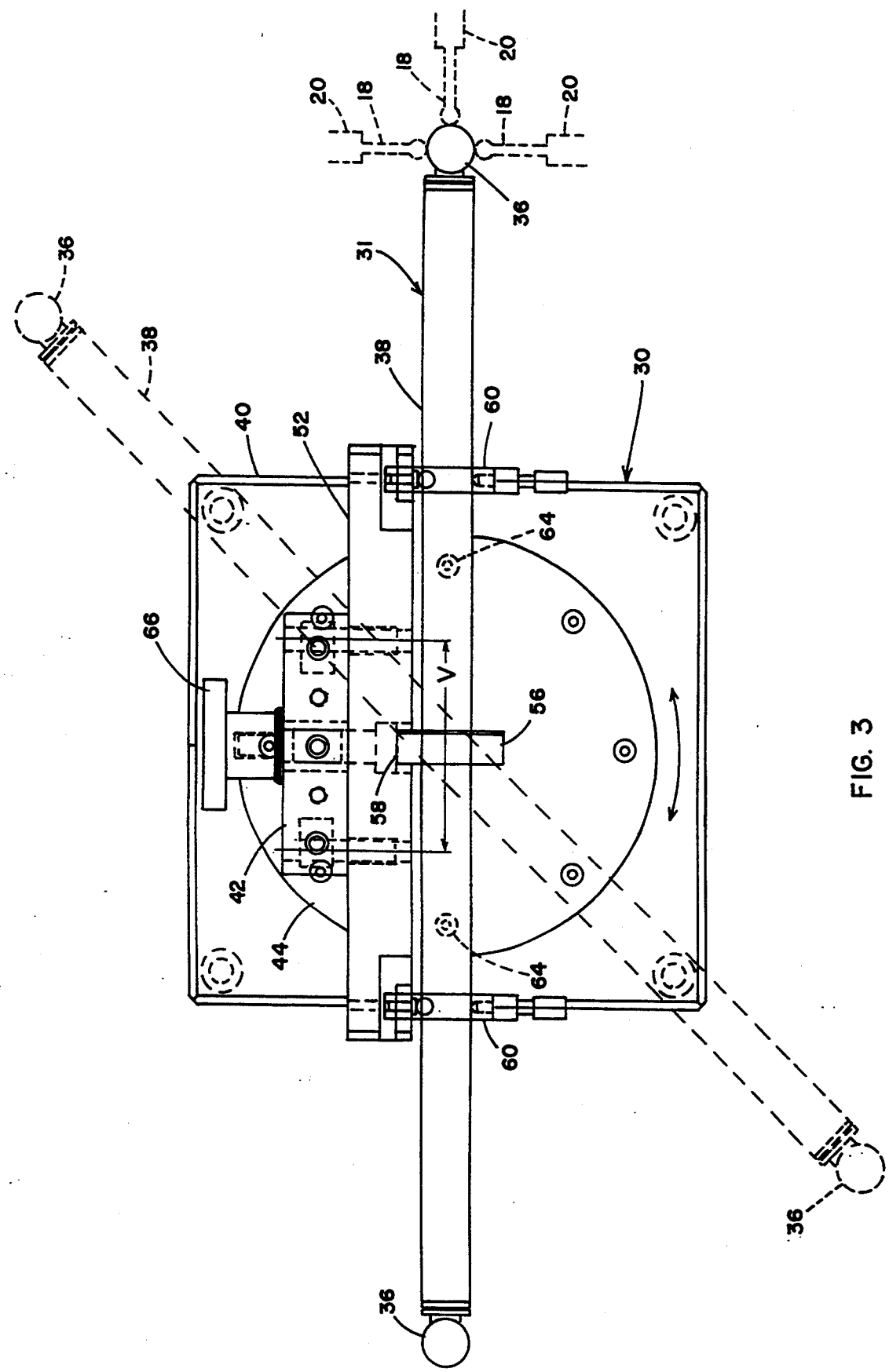
FIG. 3 is a top plan view of the certification apparatus in FIG. 2.
Figure 4:
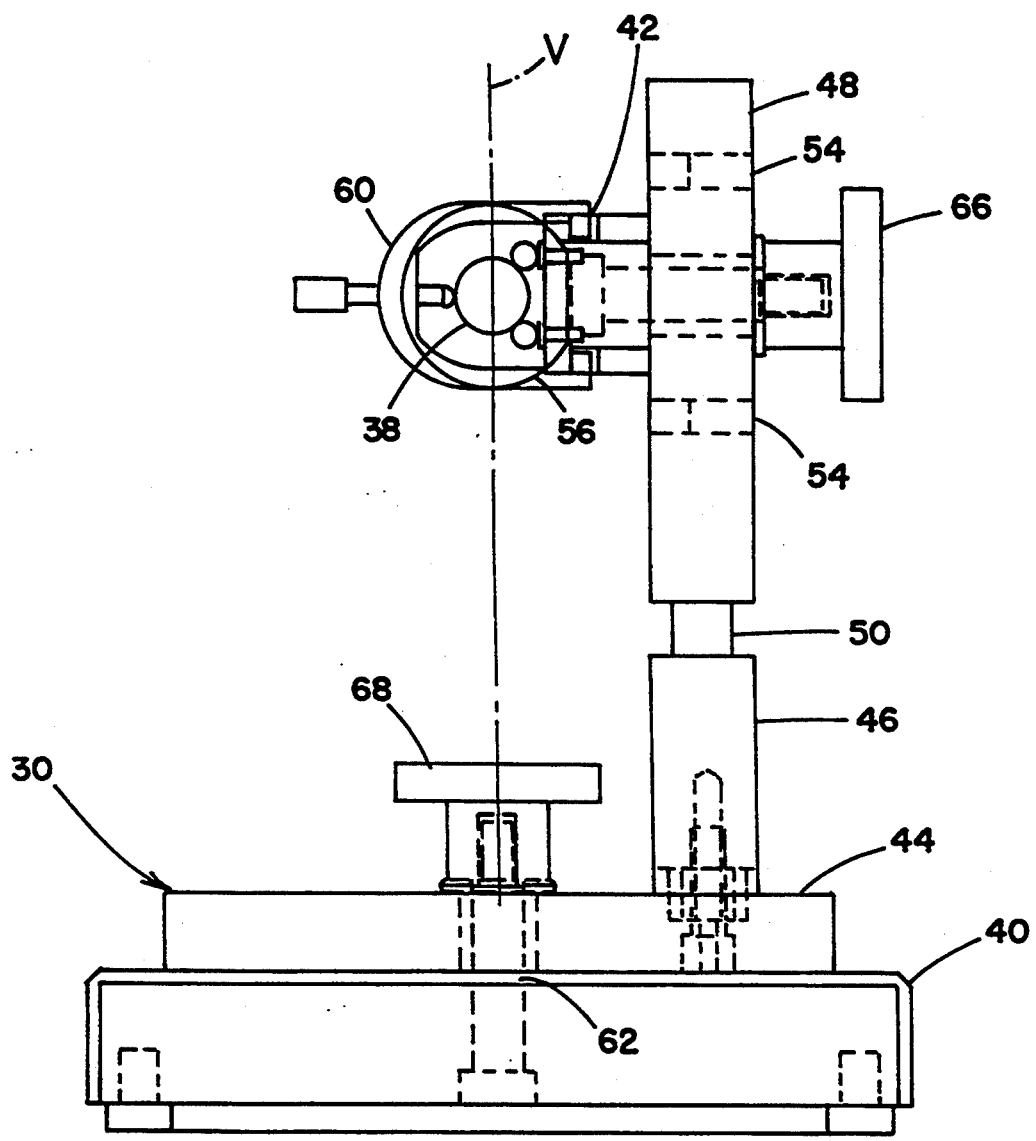
FIG. 4 is a side elevation of the certification apparatus in FIG. 2.

In order to certify the repeatability and volumetric accuracy of coordinate measuring machine 10, a certification apparatus 30 is provided (FIGS. 2-4). Certification apparatus 30 includes a calibration device 31, having at least one calibration surface 32, and a positioning device 34 for positioning surface 32 in multiple known locations within volumetric space 12. In the illustrated embodiment, calibration surface 32 is composed of a pair of spherical surfaces 36 mounted to the ends of a support bar 38. As will be set forth in more detail below, each spherical surface 36 has a certified diameter D and the centers thereof are spaced apart a certified distance L. Positioning device 34 includes a base 40, a first support assembly 42 for rotatably indexing certification device 31 about a horizontal axis H and a second support assembly 44 for rotatably indexing certification device 31 about a vertical axis V (FIGS. 2 and 3). Support assembly 44, in turn, may be divided into a lower support portion 46 affixed to a base 40, adapted to be affixed to measurement surface 16, and an upper support portion 48 which supports first support assembly 42. Upper support portion 48 is joined with lower support portion 48 by a vertical adjustment mechanism 50.

First support assembly 42 includes a bar support 52, which is pivotally mounted to upper support portion 48 of lower support assembly 44 to pivot about axis H. Indexing stops 54, such as ball-detents, or pins biased into sleeves, are provided for the purpose of allowing bar support 50 to be positioned at defined predetermined stable positions about axis H. In the illustrated embodiment, bar support 52 may be positioned horizontally, as illustrated in FIG. 2, rotated counterclockwise 45° from horizontal, as illustrated in phantom in FIG. 2, or rotated clockwise 45° from horizontal. In order to manually reposition certification device 31 about horizontal axis H, a knob 66 is provided in order to rotate bar support 52. A collar, such as a shoulder clamp 56 surrounding support bar 38 is precisely centrally located between spherical surfaces 36 and retained by an epoxy or the like. Shoulder clamp 56 is received within a cavity 58 formed in bar support 52. A pair of clamps 60 at opposite ends of bar support 52 retain support bar 38 to bar support 52. This structure provides for precise centering of support bar 38 on axis H. Furthermore, shoulder clamp 56, which is affixed to support bar 38, which may be made of a resinous plastic, or the like, provides a grasping point to allow the support bar to be removed and replaced with a support bar of different length (not shown) without touching the actual support bar. This avoids inaccuracies introduced by thermal variations in the support bar length. Bar support 52 supports support bar 38 at two points midway between collar 56 and each spherical surface 36. This significantly reduces the amount of droop experienced by certification device 31 resulting from gravity distorting the linearity support bar 38.

Second support assembly 44 is pivotally mounted to base 40 by a pivot device 62. Pivot 62 is in line with axis V such that support bar 38 rotates in a horizontal plane about axis V (FIG. 4). Indexing devices 64 are provided in order to allow lower support portion 46 to be stably positioned at multiple rotational positions about axis V. In the illustrated embodiment, the certification device 31 would have a stable position at minus 45°, as illustrated in phantom in FIG. 3, at 0°, as illustrated in FIG. 3, at plus 45° and at plus 90°. In order to index certification device 31 between positions about vertical axis V, a knob 68 is provided in order to rotate second support assembly 44 about base 40.

Thus, the combined movements of first support assembly 42 and second support assembly 44 provide 12 stable positions of certification device 31 within volumetric space 12. Positioning device 34 precisely locates each of the spherical surfaces 36 at known locations within volumetric space 12 in each of the 12 positions. In this manner, CMM 10 may be programmed to measure multiple coordinates on each spherical surface 36 at each of the 12 locations within volumetric space 12. The 12 locations are well distributed within volumetric space 12. If CMM 10 is being used to measure surfaces of part 14, which may be within an upper portion of volumetric space 12, vertical adjustment mechanism 50 may be adjusted in order to reposition the entire first support assembly 42 upwardly within volumetric space 12. Although, as will be set forth in more detail below, the positioning device 34 may be manually actuatable or automatically repositioned, it is contemplated that vertical adjustment mechanism 50 will be manually adjustable. However, vertical adjustment mechanism 50 could also be motorized instead of a manual.

Positioning device 34 is constructed in order to reposition the balls to known locations within volumetric space 12 within approximately 50 thousandths (0.050) of an inch. In the illustrated embodiment, spherical surfaces 36 are embodied in ceramic tool balls which are held to a manufacturing tolerance of 50 millionths of an inch (1.25 microns). Each of the balls is certified and documented as to actual diameter. Support bar 38 is manufactured from a low coefficient-of-thermal-expansion material such as thin-wall stainless steel bar, carbon fiber or extruded plastic. The bar length has a manufacturing tolerance of 0.005 inch. The center-to-center spacing between balls is certified and documented. In this manner, certification device 31 has precisely known surface dimensions and precisely known length. Accordingly, multiple point measurements of each spherical surface 36 at each of the 12 positions of certification device 31 may be converted into diameter of the associated sphere which may be compared with the known diameter of that sphere in order to provide one measure of volumetric accuracy of the CMM. The center of each sphere may be calculated using known computational techniques common to all coordinate measuring machines. The center-to-center distance between spherical surfaces 36 may be calculated using the classical Pythagorean theorem in the three dimensions. This calculated distance may be compared with the certified length of certification device 31 in order to provide a measurement of the volumetric accuracy of the CMM 10. By repeating the process by moving the certification device 31 through all 12 index positions multiple times, the repeatability of the CMM 10 may be determined by comparing the corresponding measurements made during each pass through the process.

Figure 6:
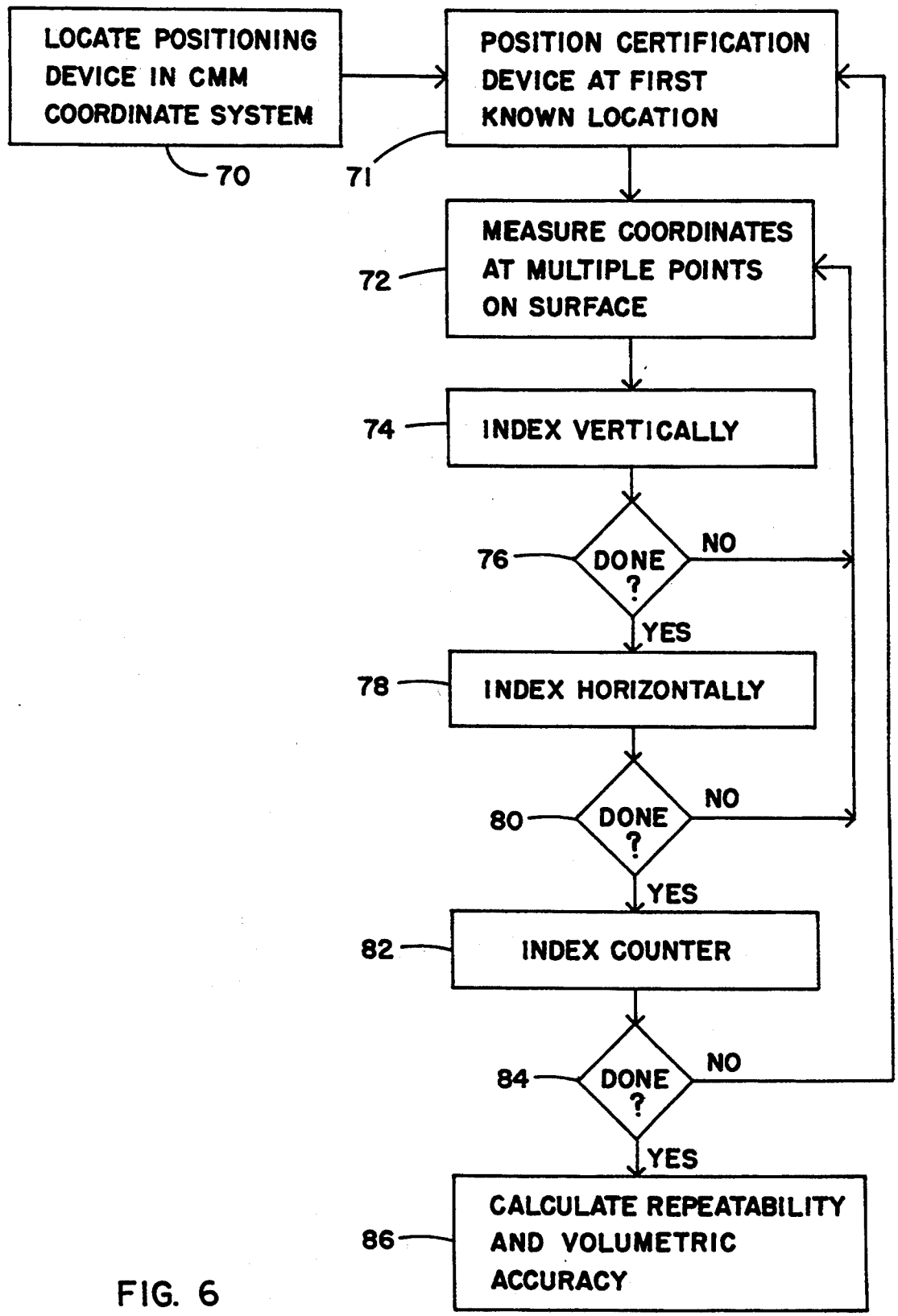
FIG. 6 is a flow diagram of a method according to the invention.

By reference to FIG. 6, the process for certifying a manual or a programmable CMM is as follows. Positioning device 34 is fixedly mounted within volumetric space 12 and referenced to the CMM coordinate system at 70 using known techniques. Certification device 31 is indexed to a first stable position at 71 by first support assembly 42 and second support assembly 44. CMM 10 is programmed to make multiple measurements of the surface coordinates of each spherical surface 36 at 72. As can be seen by FIG. 3, these multiple measurements may be made by reorienting stylus 18 and probe 20 for each of the measurements. This reorienting of the stylus and probe may additionally include reorienting in the vertical as well as in the horizontal. This detects any errors which may occur as a result of articulation of motorized head 22. After the surface coordinates of both surfaces 36 are measured and stored at 72, first support assembly 42 is indexed at 74 to the next position. If it is determined at 76 that measurements have not been made at the new position during this set of measurements, the measurements are taken at 72. First support assembly 42 is again indexed at 74 and additional measurements taken until it is determined at 76 that measurements have been made at all orientations of bar support 52 about axis H, The second support assembly 44 is then indexed at 78 and it is determined at 80 whether measurements have been made at the new position during this set of measurements. If not, measurements are made at 72 and the first support assembly 74 is indexed through the various positions and measurements made (72, 74, 76) at each vertical position for the new, horizontal orientation about axis V. After it is determined at 80 that all of the 12 discrete positions have been processed a counter is indexed and, it is determined at 84 whether the count in this counter is equal to N which means that the measurement sequence has been carried out a predetermined N times. If not, the positioning device 34 is positioned to the first discrete position and a new measuring sequence is initiated at 70. After the sequence has been repeated N times, the CMM calculates the repeatability and volumetric accuracy of the CMM at 86. Calculating repeatability and volumetric accuracy is well known in the art and may be computed directly using the CMM's resident statistical software or may be computed using an off-line routine or software added to the CMM. Each CMM is provided with software and instructions for measuring surface coordinates of parts within volumetric space 12. This software and instructions may be readily applied by those skilled in the art to carry out the invention as described herein.

Figure 5:
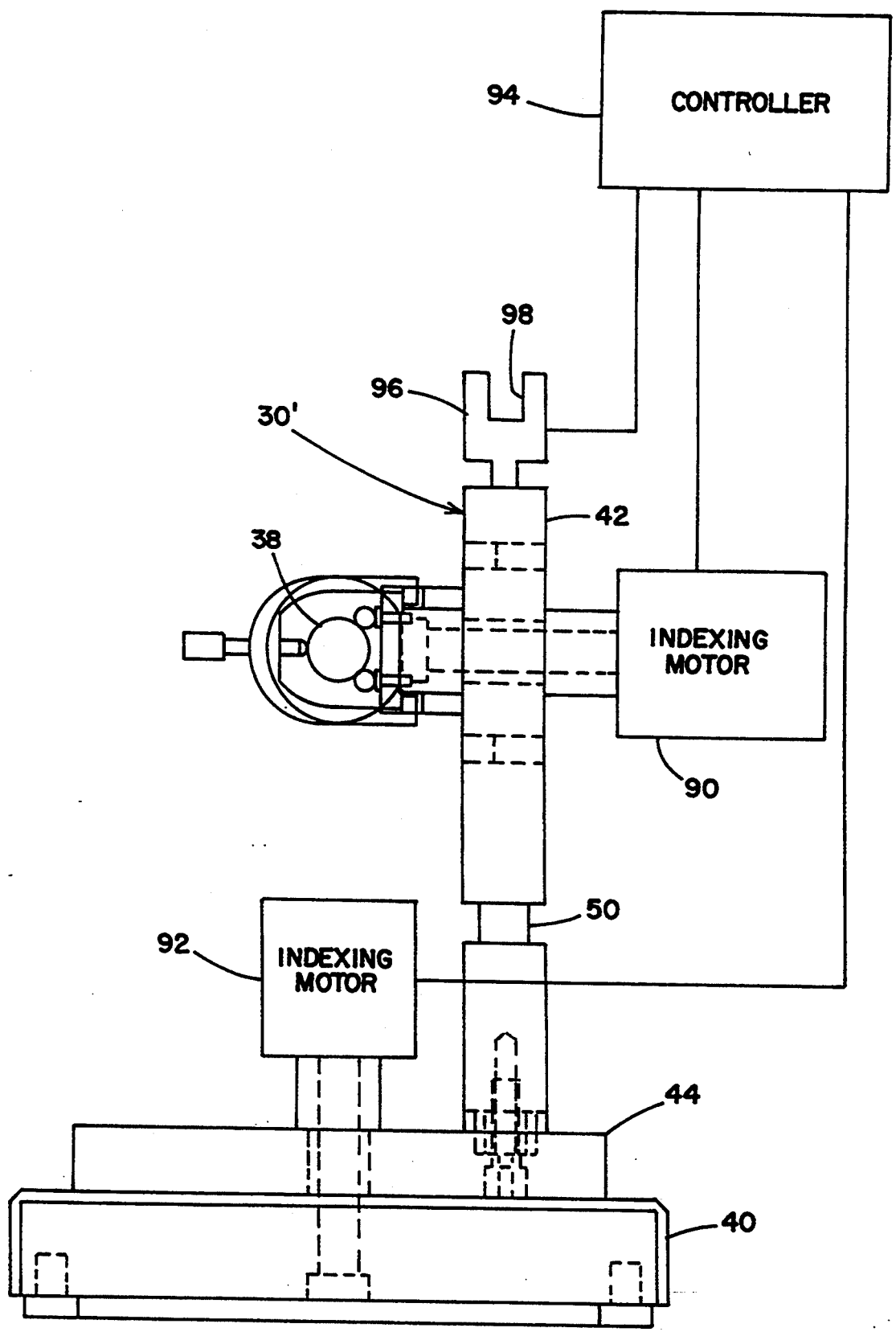
FIG. 5 is the same view as FIG. 4 of an alternative embodiment of the invention.

When utilizing certification apparatus 30 with a programmable CMM, the CMM may be programmed in order to move head 22 to a clear spot and stop after each set of measurements is taken at 72. This provides a que to the user to manually index (74, 78) positioning device 34. An alternative certification apparatus 30' is disclosed in FIG. 5, in which first support assembly 42 is positioned by an indexing motor 90 and second support assembly 44 is positioned by an indexing motor 92. Indexing motors 90 and 92 are controlled by a controller 94. Controller 94 is programmed in order to index (74, 78) the support assemblies to the 12 given locations N times. If certification apparatus 30' is utilized with a programmable CMM, a proximity sensor 96 is provided in order to provide an indexing input to controller 94. Sensor 96 includes a sensing channel 98, which provides a target for the user to reposition stylus 18 after measurements are made at 72. This provides an input to controller 94 in order to cause controller 94 to index (74, 78) to the next stable position. Advantageously, certification apparatus 30' is controlled independently of the controller of the CMM. This allows certification apparatus 30' to be adapted to any of the commercially available CMMs without concern as to the mechanical and electrical makeup of the CMM.

In a preferred embodiment, certification device 31 is provided by a pair of ballbars: one 12 inches in length and one 18 inches in length. This combination allows certification of a wide range of CMM measuring volumes. Of course, the ballbar length is a function of the size of volumetric space 12 and lengths of 24 and 36 inches, or greater, are comprehended. The measurement procedure according to the invention provides for the evaluation of linearity in both X and Y axes because certification device 31 can be aligned with either axis. If vertical adjustment mechanism 50 is adjusted to an uppermost position, certification device 31 may be repositioned to a vertical orientation in order to certify the Z axis independently. Squareness evaluations of the CMM are accommodated in all combinations of two planes with standard positioning orientation as well as all three measurement planes at once. These accuracy indicators are easily identified and evaluated through consistent measuring sequences and reporting. The present invention provides means to check the CMM's probe system for spherical measuring accuracy. The certification apparatus will also check the movement repeatability of the articulating head. This is accommodated due to the ability to measure spherical surfaces 36 in each of the stable positions and from any accessible direction.

Thus, it is seen that the present invention uniquely provides a coordinate measuring machine certification technique that is useable with either manual or programmable CMMs. The present invention certifies both repeatability and volumetric accuracy of the CMM in a single series of measurements. This certification is provided over large spans in the measuring space. Furthermore, the present invention does not require physical interconnections of any sort with the CMM being certified, although interconnections may be provided, if desired. However, the present invention exercises all components of the CMM, including the motorized head and the touch-trigger probe.

Changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. A coordinate measuring machine certification apparatus comprising:
   a certified ballbar having a pair of spherical surfaces connected with a bar, each of said spherical surfaces having a certified diameter and defining a center of that ball and the distance between said center of one said spherical surface to said center of the other said spherical surface being a certified distance; and
   a positioning device for positioning said spherical surfaces in multiple known locations within the measurement volume of the coordinate measuring machine being certified including a bar support that supports said ballbar at a midpoint of said bar between said balls wherein said ballbar is supported free of attachments to said balls, said positioning device including a first rotational assembly for rotatably supporting said bar support for rotational motion about a horizontal axis in defined increments and a second rotational assembly for rotatably supporting said bar support for rotation motion about a vertical axis in defined increments.

2. The apparatus in claim 1 wherein said first rotational assembly supports said ballbar and said second rotational assembly supports said first rotational assembly.

3. The apparatus in claim 1 wherein said bar support includes a stiffening member in order to resist droop in said bar.

4. The apparatus in claim 1 including a first motor for rotating said first rotational assembly and a second motor for rotating said second rotational assembly.

5. The apparatus in claim 4 including a proximity sensor positioned within the measurement volume of the coordinate measuring machine and connected with the positioning device for sensing the presence of a moveable portion of a coordinate measuring machine and a control responsive to said sensor in order to cause at least one of said first and second motors to index its associated rotational assembly when said moveable portion is adjacent said proximity sensor.

6. The apparatus in claim 1 including means for vertically adjusting said first rotatable assembly.

7. A coordinate measuring machine certification apparatus comprising:
 a certified ballbar having a pair of spherical surfaces connected with a bar; and
 a positioning device for positioning said spherical surfaces in multiple known locations within the measurement volume of the coordinate measuring machine being certified, said positioning device including a bar support that supports said ballbar at a midpoint of said bar between said balls wherein said ballbar is supported free of attachments to said balls, a horizontal pivot for said bar support that provides rotation of said bar support in a clockwise direction to position said ballbar in a first set of angular orientations and in a counterclockwise direction to position said ballbar in a second set of angular orientations, and a vertical pivot for said bar support that provides rotation of said bar support in substantially a complete revolution.

8. The apparatus in claim 7 including positional stops for positioning said ballbar at fixed angular increments in said clockwise and counterclockwise directions and in said full revolution, in order to allow said bar support to be positioned at predetermined stable positions.

9. The apparatus in claim 8 wherein said positional stops are ball-detents.

10. The apparatus in claim 8 wherein said positional stops are pins biased into sleeves.

11. The apparatus in claim 7 including an extension member that selectively positions said horizontal pivot in at least two positions in order to provide movement of said ballbar throughout the measurement space of the coordinate measuring machine.

12. The apparatus in claim 7 including a first motor for rotating said bar support about said horizontal axis and a second motor for rotating said bar support about said vertical axis.

13. The apparatus in claim 12 including a sensor for sensing the presence of a moveable portion of a coordinate measuring machine and a control responsive to said sensor for causing at least one of said first and second motors to index said bar support when said moveable portion is sensed by said sensor.

14. The apparatus in claim 7 wherein said vertical pivot includes a base member and a vertically elongated member pivotally supported at one end to said base member and wherein said horizontal pivot is supported at an opposite end of said vertically elongated member, wherein said horizontal pivot is spaced apart from said base member.

15. The apparatus in claim 7 wherein said bar support includes a stiffening member in order to resist droop in said bar.

16. The apparatus in claim 7 wherein said bar support includes a collar made from a heat-insulating material in order to provide a grasping point to allow replacement of the ballbar.

17. A method for certifying a coordinate measuring machine having a three-dimensional coordinate measuring space and a measuring stylus having an articulating probe, including:
 providing a certified ballbar having a pair of spherical surfaces connected with a bar;
 positioning said certified ballbar in the coordinate measuring space using a positioning device having a bar support that supports said ballbar at a midpoint of said bar between said balls wherein said ballbar is supported free of attachments to said balls;
 measuring with the coordinate measuring machine coordinates at opposite locations on the surface of each of said balls including changing the orientation of the probe between the measurements; and
 processing said measured coordinates into measured surface parameters and comparing said measured surface parameters with known values of said surface parameters.

18. The method of claim 17 including positioning said certified ballbar in the coordinate measuring space in multiple known locations using said positioning device and performing said measuring and processing at each of the multiple locations.

19. The method of claim 18 including repeating said measuring and processing multiple times in said multiple known locations in order to determine the repeatability of the coordinate measuring machine.

20. The method of claim 18 wherein said positioning said ballbar in the coordinate measuring space in multiple known locations includes rotating said bar support in a clockwise direction to position said ballbar in a first set of angular orientations and in a counterclockwise direction to position said ballbar in a second set of angular orientations, and rotating said bar in substantially a full vertical revolution while taking first and second sets of angular orientations at predefined radial positions.

21. The method of claim 17 including measuring with the coordinate measuring machine coordinates at multiple points on the surface of both of said balls including changing the orientation of the probe between at least two of the measurements at each of said balls.

22. The method of claim 21 including processing said measured coordinates into measured sphere separation distance parameters and comparing said measured sphere separating distance parameter with a known sphere separation distance parameter.

* * * * *